US012294601B2

(12) United States Patent
Omkar et al.

(10) Patent No.: US 12,294,601 B2
(45) Date of Patent: May 6, 2025

(54) DETECTION OF ANOMALOUS BEHAVIOR ON ONLINE PLATFORMS USING MACHINE LEARNING TECHNIQUES

(71) Applicant: Dell Products L.P., Round Rock, TX (US)

(72) Inventors: Tanuj Arcot Omkar, Cedar Park, TX (US); Rodrigo de Souza Scorsatto, Porto Alegre (BR); Aravind Reddy Lakkadi, Flower Mound, TX (US); Jonathan Leventis, College Station, TX (US); Kasey Mallette, Las Vegas, NV (US); Vinicius Facco Rodrigues, Sao Paulo (BR); Rodrigo da Rosa Righi, São Leopoldo (BR); Lucas Micol Policarpo, São Leopoldo (BR); Thaynã da Silva França, São Leopoldo (BR); Jorge Luis Victória Barbosa, São Leopoldo (BR); Rodolfo Stoffel Antunes, São Leopoldo (BR); Cristiano André da Costa, São Leopoldo (BR)

(73) Assignee: Dell Products L.P., Round Rock, TX (US)

(*) Notice: Subject to any disclaimer, the term of this patent is extended or adjusted under 35 U.S.C. 154(b) by 108 days.

(21) Appl. No.: 18/336,594

(22) Filed: Jun. 16, 2023

(65) Prior Publication Data
US 2024/0422184 A1 Dec. 19, 2024

(51) Int. Cl.
*H04L 9/40* (2022.01)
*H04L 67/1396* (2022.01)

(52) U.S. Cl.
CPC .......... *H04L 63/1425* (2013.01); *H04L 63/10* (2013.01); *H04L 67/1396* (2022.05)

(58) Field of Classification Search
CPC .. H04L 63/1425; H04L 63/10; H04L 67/1396
See application file for complete search history.

(56) References Cited

U.S. PATENT DOCUMENTS

2016/0261465 A1* 9/2016 Gupta ................. H04L 63/1425
2019/0230105 A1* 7/2019 Hodgman ........... H04L 63/1425
(Continued)

OTHER PUBLICATIONS

Policarpo, L. M., et al, "Machine learning through the lens of e-commerce initiatives: An up-to-date systematic literature review", Computer Science Review 41 (2021) 100414, Aug. 1, 2021.
(Continued)

*Primary Examiner* — El Hadji M Sall
(74) *Attorney, Agent, or Firm* — Ryan, Mason & Lewis, LLP

(57) ABSTRACT

Methods, apparatus, and processor-readable storage media for detection of anomalous behavior on online platforms using machine learning techniques are provided herein. An example method includes obtaining a set of machine learning models configured to detect anomalous behavior associated with users interacting with an online platform and performing an incremental machine learning process on one or more of the machine learning models in the set. The incremental machine learning process may include obtaining data related to interactions of users with the online platform, updating at least one of the machine learning models in the set based on the obtained data, comparing the machine learning models, and selecting one of the machine learning models from the set to be used by the online platform based on the comparison. The method may further include determining, utilizing the selected machine learning model, that a given user is exhibiting anomalous behavior on the online platform.

20 Claims, 15 Drawing Sheets

(56) References Cited

U.S. PATENT DOCUMENTS

| | | | | |
|---|---|---|---|---|
| 2019/0238575 A1* | 8/2019 | Hodgman | ............ | H04L 63/1433 |
| 2020/0285737 A1* | 9/2020 | Kraus | .................... | G06F 21/552 |
| 2020/0374298 A1* | 11/2020 | Sirianni | .................... | G06N 3/04 |
| 2021/0281592 A1* | 9/2021 | Givental | ................. | G06N 20/10 |
| 2022/0060497 A1* | 2/2022 | Crabtree | ............. | H04L 63/1416 |
| 2023/0262072 A1* | 8/2023 | Cambric | ................. | G06F 21/55 |
| | | | | 726/22 |
| 2024/0121242 A1* | 4/2024 | Miyake | ................. | H04L 63/102 |

OTHER PUBLICATIONS

Rodrigues, Vinicius Facco, et al. "Fraud detection and prevention in e-commerce: A systematic literature review." IEEE Transactions on Knowledge and Data Engineering, vol. 21, No. 5, May 2021.

\* cited by examiner

| FIELD | DESCRIPTION |
|---|---|
| TIME | TIME CAPTURED OF THE EVENT BY THE ONLINE PLATFORM |
| MCMID | USER UNIQUE IDENTIFICATION BASED ON WEB BROWSER COOKIES |
| BROWSER_VERSION | USER WEB BROWSER VERSION |
| COUNTRY | COUNTRY OF THE WEB PAGE THE USER IS BROWSING |
| CUSTOMERSET | CLASSIFICATION USED BY COMPANY A TO LABEL DIFFERENT TYPES OF USERS |
| SEGMENT | ONLINE PLATFORM SECTOR REFERRING TO PAGE THE USER IS ON |
| DGV | INFORMATION ABOUT HOW THE USER ENTERED THE SITE |
| ISBOT | CLASSIFICATION DEFINING THE USER AS "BOT" OR "NOT BOT" |
| PAGETYPE | CATEGORY OF URL OF ONLINE PLATFORM WHERE THE USER IS BROWSING |
| URL | URL REQUESTED BY THE USER |
| REFERRER | PREVIOUS URL VISITED BY THE USER |

| FIELD | DESCRIPTION |
|---|---|
| _TIME | EVENT CAPTURE TIME BY THE ONLINE PLATFORM |
| MCMID | USER UNIQUE IDENTIFICATION BASED ON WEB BROWSER COOKIES |
| IPADDRESS | USER'S IP ADDRESS |
| IP_COUNTRY | IP ADDRESS COUNTRY |
| IP_CITY | IP ADDRESS CITY |
| SESSIONID | UNIQUE IDENTIFIER REPRESENTING THE CUSTOMER SESSION |
| PROFILEID | A UNIQUE IDENTIFIER REPRESENTING THE CUSTOMER PROFILE |
| LOGGEDIN | A FLAG THAT REPRESENTS WHETHER THE USER IS LOGGED IN OR NOT |
| X_FORWARDED_FOR | NUMBER OF NETWORK HOPS FROM THE CUSTOMER CLIENT TO THE SERVER |
| USER_AGENT | INFORMATION ABOUT THE DEVICE AND BROWSER OF THE USER |
| CSH | SALTED HASH OF THE CREDIT CARD INFORMATION |
| COUNTRY | COUNTRY OF THE WEB PAGE THE USER IS BROWSING |
| URL | URL THE USER REQUESTED |

| FIELD | DESCRIPTION |
|---|---|
| _TIME | EVENT CAPTURE TIME BY ONLINE PLATFORM |
| MCMID | USER UNIQUE IDENTIFICATION BASED ON WEB BROWSER COOKIES |
| IPADDRESS | USER'S IP ADDRESS |
| IP_COUNTRY | IP ADDRESS COUNTRY |
| SESSIONID | UNIQUE IDENTIFIER REPRESENTING THE USER'S SESSION |
| FORMFACTOR | TYPE OF DEVICE OF THE USER |
| BROWSER | BROWSER NAME |
| DEVICE | USER DEVICE MODEL |
| OS | USER'S OPERATING SYSTEM |
| LOGGEDIN | FLAG THAT REPRESENTS WHETHER THE USER IS LOGGED IN OR NOT |
| PROFILEID | UNIQUE IDENTIFIER REPRESENTING THE CUSTOMER PROFILE |
| DPID | ORDER UNIQUE IDENTIFIER |
| COUNTRY | COUNTRY OF THE WEB PAGE THE USER IS BROWSING |
| SEGMENT | SECTOR REFERRING TO THE PAGE THE USER IS ON |
| PRODUCTID | UNIQUE IDENTIFIER OF PRODUCT |
| ITEMQUANTITY | NUMBER OF PRODUCTS IN THE ORDER. |
| PRODUCTTYPE | PRODUCT CLASSIFICATION ACCORDING TO THE ONLINE PLATFORM |
| PAYMENTTYPENAME | FORM OF PAYMENT |
| BILLING_EMAIL | BILLING E-MAIL INFORMATION |
| SHIPPING_EMAIL | SHIPPING E-MAIL INFORMATION |
| BILLING_POSTALCODE | BILLING POSTAL CODE |
| SHIPPING_POSTALCODE | SHIPPING POSTAL CODE INFORMATION |
| BILLING_STREET | BILLING STREET INFORMATION |
| SHIPPING_STREET | SHIPPING STREET INFORMATION |
| BILLING_COUNTRY | BILLING COUNTRY INFORMATION |
| SHIPPING_COUNTRY | SHIPPING COUNTRY INFORMATION |
| BILLING_CITY | BILLING CITY INFORMATION |
| SHIPPING_CITY | SHIPPING CITY INFORMATION |
| POSTALCODE | POSTAL CODE OF USER PROFILE |
| EMAIL | EMAIL OF USER PROFILE |
| PAYMENTTYPECODE | CODE OF THE FORM OF PAYMENT |
| CSH | HASH IDENTIFICATION OF THE CREDIT CARD INFORMED FOR PAYMENT |

FIG. 8

| FIELD | DESCRIPTION |
|---|---|
| DPID | ORDER UNIQUE IDENTIFIER |
| CUSTOMER_NUM | CUSTOMER NUMBER OF USER PROVIDED BY GAFT |
| ORDER_SOURCE | SOURCE OF ORDER |
| ESTD_DELIVERY_DAYS | NUMBER OF DAYS ESTIMATED UNTIL DELIVERY |
| CUST_EMAIL | CUSTOMER'S EMAIL |
| ORDER_DTS | ORDER TIMESTAMP |
| ORDER_AMOUNT_USD | TOTAL AMOUNT OF ORDER IN USD |
| PRODUCT | PRODUCT CATEGORY |
| PRODUCT_QTY | QUANTITY OF PRODUCTS PURCHASED |
| FRAUD_FLAG | GAFT EVALUATION OF ORDER (TYPES: FRAUD, RESELLER, GOOD) |
| NEGATIVE_HISTORY_FLAG | FLAG INDICATING IF THE USER COMMITTED A FRAUD IN THE PAST |
| EMAIL_RISK | RISK EVALUATION BASED ON THE EMAIL OF THE CUSTOMER |
| IDENTITY_RISK | RISK EVALUATION BASED ON THE CUSTOMER INFORMATION |

| ID | DESCRIPTION | SOURCE |
|---|---|---|
| 00 | NUMBER OF TIMES THAT CSH WAS USED | CSH |
| 01 | NUMBER OF TIMES THAT AN IP ADDRESS TESTED A CREDIT CARD | CSH |
| 02 | NUMBER OF TIMES THAT A MCMID TESTED A CREDIT CARD | CSH |
| 03 | NUMBER OF TIMES THAT A PROFILE ID TESTED A CREDIT CARD | CSH |
| 04 | NUMBER OF TIMES THAT A USER TESTED A CREDIT CARD | CSH |
| 05 | MEAN TIME BETWEEN CREDIT CARD TESTS | CSH |
| 06 | NUMBER OF PAGES REQUESTED BY USER | NAV |
| 07 | MEAN TIME BETWEEN PAGE REQUESTS | NAV |
| 08 | NUMBER OF REPEATED ORDERS PLACED BY A USER FOR SAME PRODUCT | PUR |
| 09 | NUMBER OF REPEATED ORDERS PLACED BY AN IP FOR SAME PRODUCT | PUR |
| 10 | NUMBER OF PURCHASE ORDERS PLACED BY A MCMID | PUR |
| 11 | NUMBER OF PURCHASE ORDERS PLACED BY A PROFILE ID | PUR |
| 12 | NUMBER OF PURCHASE ORDERS PLACED BY AN IP ADDRESS | PUR |
| 13 | NUMBER OF PURCHASE ORDERS PLACED BY A USER | PUR |
| 14 | NUMBER OF PURCHASE ORDERS PLACED FROM A CSH | PUR |
| 15 | MEAN OF ALL ELAPSED TIME BETWEEN PLACED PURCHASE ORDERS OF A USER | PUR |

DETECTION OF ANOMALOUS BEHAVIOR ON ONLINE PLATFORMS USING MACHINE LEARNING TECHNIQUES

BACKGROUND

Organizations are increasingly utilizing online platforms to provide products and/or services to users. Anomalous behavior can disrupt the operation of such online platforms. In some cases, the anomalous behavior is the result of fraudulent and/or malicious users. It can be difficult to detect and prevent such behavior.

SUMMARY

Illustrative embodiments of the disclosure provide techniques for detection of anomalous behavior on online platforms using machine learning techniques. An exemplary computer-implemented method includes obtaining a set of machine learning models configured to detect at least one type of anomalous behavior associated with one or more users interacting with an online platform and performing an incremental machine learning process on one or more of the machine learning models in the set. The incremental machine learning process may include: obtaining data related to interactions of the one or more users with the online platform, updating at least one machine learning model from the set of machine learning models based on at least a portion of the obtained data, comparing performance metrics determined for respective ones of the machine learning models in the set, and selecting one of the machine learning models from the set to be used by the online platform based at least in part on a result of the comparing. The method may also include determining, utilizing the selected machine learning model, that a given user is exhibiting the at least one type of anomalous behavior on the online platform, and initiating one or more automated actions on the online platform to at least partially mitigate the anomalous behavior of the given user.

Illustrative embodiments can provide significant advantages relative to conventional anomaly detection techniques. For example, technical problems associated with detecting anomalous behavior on online platforms are mitigated in one or more embodiments by implementing an incremental machine learning framework that can be updated to detect evolving types of anomalous behavior in substantially real time.

These and other illustrative embodiments described herein include, without limitation, methods, apparatus, systems, and computer program products comprising processor-readable storage media.

BRIEF DESCRIPTION OF THE DRAWINGS

FIGS. 6 through 9 show tables of data fields associated with different types of events on an online platform in accordance with some embodiments.

FIG. 10 shows a table of features utilized in at least some machine learning models of an anomaly detection system in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
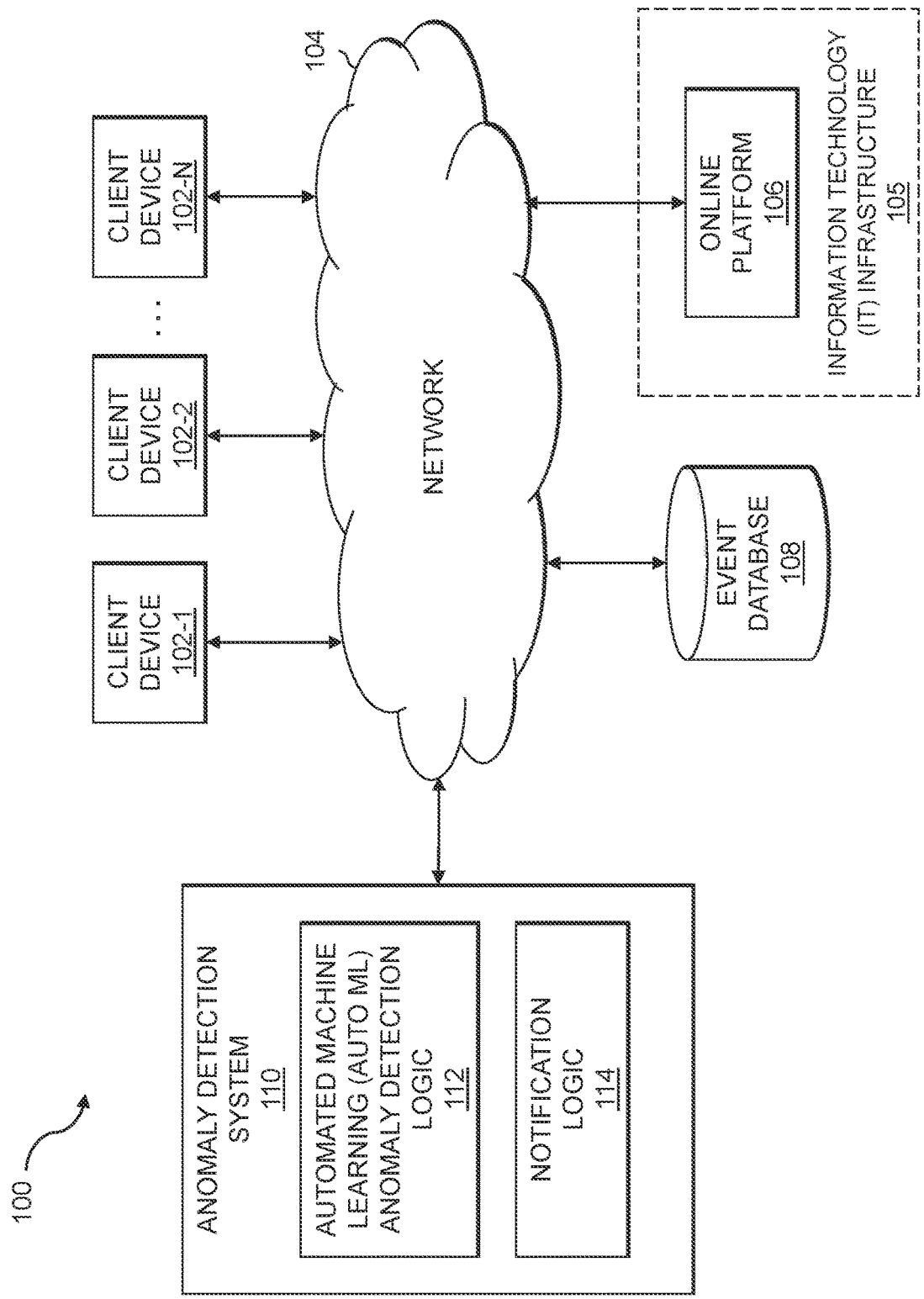
FIG. 1 is a block diagram of an information processing system configured for detecting data anomalies using incremental machine learning techniques in an illustrative embodiment.

FIG. 1 shows an information processing system 100 configured in accordance with an illustrative embodiment. The information processing system 100 is assumed to be built on at least one processing platform and provides functionality for detecting anomalous behavior on an online platform 106 utilizing machine learning techniques. The information processing system 100 includes a set of client devices 102-1, 102-2, . . . 102-N (collectively, client devices 102) which are coupled to a network 104 used to access the online platform 106 that runs on information technology (IT) infrastructure 105.

In some embodiments, the online platform 106 may correspond to an e-commerce platform that comprises a website or application that is accessed by users of the client devices 102 for purchasing products and/or services.

The online platform 106 may run on various IT assets of the IT infrastructure 105, where the IT assets may include physical and virtual computing and/or storage resources. Also coupled to the network 104 is an event database 108 and an anomaly detection system 110.

The anomaly detection system 110 is configured to analyze behavior of users (e.g., of the client devices 102) of the online platform 106, to detect anomalous user behavior (such as fraudulent and/or malicious behavior). To do so, the anomaly detection system 110 in the FIG. 1 example implements automated machine learning (auto ML) anomaly detection logic 112. In some embodiments, the anomaly detection system 110 analyzes events from the event database 108, where the events characterize user behavior as users of the client devices 102 navigate a website or other interface of the online platform 106. When anomalous user behavior is detected via the anomaly detection system 110, the anomaly detection system 110 utilizes notification logic 114 to inform the online platform 106 of such behavior and to initiate one or more actions to prevent or mitigate such behavior.

The client devices 102 may comprise, for example, physical computing devices such as mobile telephones, laptop computers, tablet computers, desktop computers, Internet of Things (IoT) devices, or other types of devices. Such devices are examples of what are more generally referred to herein as "processing devices." Some of these processing devices are also generally referred to herein as "computers." The client devices 102 in some cases may also or alternatively comprise virtualized computing resources, such as virtual machines (VMs), software containers, etc.

The client devices 102 may in some embodiments comprise respective computers associated with different companies, entities, enterprises or other organizations. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The online platform 106 running on IT assets of the IT infrastructure 105 may be associated with, or operated by, one or more enterprises or other organizations. The online platform 106 and the IT infrastructure 105 on which the online platform 106 runs may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.).

The cloud infrastructure may also host at least a portion of the client devices 102. A given enterprise system may host assets that are associated with multiple enterprises (e.g., two or more different businesses, entities, or other organizations). For example, in some cases the IT infrastructure 105 may host multiple different online platforms associated with different enterprises (e.g., different vendors) which offer their products and services to users of the client devices 102. Each of such multiple online platforms may utilize the anomaly detection system 110 (or another instance thereof) for analyzing user behavior on that platform to detect, and possibly prevent, certain types of user activity (e.g., fraudulent activity and/or reseller activity). The event database 108 and/or the anomaly detection system 110, although shown in FIG. 1 as being implemented external to the IT infrastructure 105, may in other embodiments be at least partially implemented using IT assets of the IT infrastructure 105.

The event database 108, as discussed above, is configured to store and record various information that is used by the anomaly detection system 110 in detecting whether user behavior on the online platform 106 is anomalous. Such data may include events which characterize how the users navigate among pages or other parts of the website or other interfaces of the online platform 106. The events may also or alternatively characterize submission of payment information (e.g., credit card information) to the online platform 106. The event database 108 in some embodiments is implemented using one or more storage systems or devices associated with the anomaly detection system 110. In some embodiments, one or more of the storage systems utilized to implement the event database 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102, the online platform 106, the event database 108 and the anomaly detection system 110, as well as to support communication therebetween and with other related systems and devices not explicitly shown.

Although the online platform 106 is shown in the FIG. 1 embodiment as being separate from the client devices 102 (e.g., as a stand-alone server, set of servers or other type of system coupled via the network 104 to the client devices 102 and the online platform 106), the anomaly detection system 110 or at least portions thereof (e.g., one or more of the auto ML anomaly detection logic 112 and the notification logic 114) may in other embodiments be implemented at least in part internally to one or more of the client devices 102 and/or the online platform 106. In some embodiments, the anomaly detection system 110 is implemented as a service that the online platform 106 (and potentially other distinct online platforms) and/or the client devices 102 subscribe to.

The client devices 102, the online platform 106, the event database 108, and the anomaly detection system 110 in the FIG. 1 embodiment are assumed to be implemented using at least one processing device. Each such processing device generally comprises at least one processor and an associated memory, and implements at least a portion of the functionality of such elements, such as one or more of the anomaly detection system 110 and notification logic 114 of the anomaly detection system 110.

It is to be appreciated that the particular arrangement of the client devices 102, the online platform 106, the event database 108 and the anomaly detection system 110 illustrated in the FIG. 1 embodiment is presented by way of example only, and alternative arrangements can be used in other embodiments. As discussed above, for example, the anomaly detection system 110 may in some cases be implemented at least in part internal to one or more of the client devices 102 and/or the online platform 106. At least portions of the auto ML anomaly detection logic 112 and the notification logic 114 may be implemented at least in part in the form of software that is stored in memory and executed by a processor.

It is to be understood that the particular set of elements shown in FIG. 1 for detecting potentially malicious behavior on the online platform 106 utilizing machine learning is presented by way of illustrative example only, and in other embodiments additional or alternative elements may be used. Thus, another embodiment may include additional or alternative systems, devices and other network entities, as well as different arrangements of modules, logic and other components.

The client devices 102, the online platform 106, the event database 108, the anomaly detection system 110 and other portions of the system 100, as described above and in further detail below, may be part of cloud infrastructure.

The client devices 102, the online platform 106, the event database 108, the anomaly detection system 110, and other components of the information processing system 100 in the FIG. 1 embodiment are assumed to be implemented using at least one processing platform comprising one or more processing devices each having a processor coupled to a memory. Such processing devices can illustratively include particular arrangements of compute, storage, and network resources.

The client devices 102, the online platform 106, the event database 108 and the anomaly detection system 110, or components thereof, may be implemented on respective distinct processing platforms, although numerous other arrangements are possible. For example, in some embodiments at least portions of the client devices 102, the online platform 106, the event database 108, and the anomaly detection system 110, or components thereof, are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the online platform 106, the event database 108, and the anomaly detection system 110, or portions or components thereof, to reside in different data centers. Numerous other distributed implementations are possible.

Additional examples of processing platforms utilized to implement the client devices 102, the online platform 106, the event database 108, the anomaly detection system 110, and other components of the system 100 in illustrative embodiments will be described in more detail below in conjunction with FIGS. 13 and 14.

It is to be appreciated that these and other features of illustrative embodiments are presented by way of example only, and should not be construed as limiting in any way.

One or more embodiments can provide technical solutions for detecting anomalous behavior (including fraudulent and/or malicious actions) in online platforms, such as online platform 106. Such fraudulent actions include, but are not limited to, attempting to purchase products using stolen payment cards (e.g., credit cards and/or gift cards) and reseller abuse (e.g., in which a malicious actor purchases all available inventory for a specific product from one platform and then resells that product at an inflated price on some other platform). These fraudulent actions can significantly impact a customer experience, such that legitimate actors (e.g., non-fraudulent actors) are not able to purchase products.

Conventional approaches for detecting anomalous behavior suffer from various technical problems. For example, some conventional approaches solely aim to identify anomalous behaviors associated with fraudulent transactions. For example, conventional approaches can consider the identification of fraudsters from a credit card validation procedure or from an analysis based on financial account information. Such approaches generally try to identify anomalous behavior based on a financial approach instead of a data-oriented approach. As an example, it is common for conventional approaches to allow online platforms to approve a purchase order when a user places it and, only after such an action, a verification is performed to identify whether there were any problems. In other words, the verification process occurs after the completion of the purchase.

In this context, at least some of the technical solutions described herein can provide data-oriented approaches that allow fraud and reseller behavior to be proactively detected (e.g., prior to a purchase being completed) using one or more artificial intelligence AI and/or ML models, that can be automatically evaluated and improved using real-time and/or near real-time data. Accordingly, in at least one embodiment, the ML models can continuously adapt to changing anomalous behavior (e.g., as malicious actors modify tactics), thereby generating predictions with a low false positive rate and high accuracy relative to conventional approaches. In this way, the e-commerce platform provides improved services through avoiding or preventing fraudulent actions (e.g., which can lead to loss of revenue, negative customer experience, damage to brand reputation, etc.).

Some of the technical solutions described herein can provide anomaly detection systems (e.g., the anomaly detection system 110) configured to detect different types of anomalous behavior, such as fraudulent or malicious behavior, on online platforms (e.g., online platform 106) in real-time or near real-time. The technical solutions described herein thus provide various technical advantages for end-user reliability and security. Further, the technical solutions described herein can address technical problems related to supply shortages, which can be seen in different sales branches. At least some of the technical solutions described herein improve the availability of desired products and/or services on an online platform (e.g., a vendor website).

Additional technical advantages in some embodiments include the mitigation of risks from the viewpoint of an operator of an e-commerce platform, since the technical solutions described herein can avoid or reduce transactions made by malicious actors (e.g., resellers, users with stolen credit cards, etc.), which typically consume a significant amount of time and resources (including computing resources). At least some of the detection systems described herein can produce the desired detection in real-time or near real-time (e.g., in milliseconds to seconds) to stop or deter fraudulent behavior. According to some embodiments, the systems can provide further advantages using an architecture that ensures scalability of online platforms in daily and peak operating scenarios.

Figure 2:
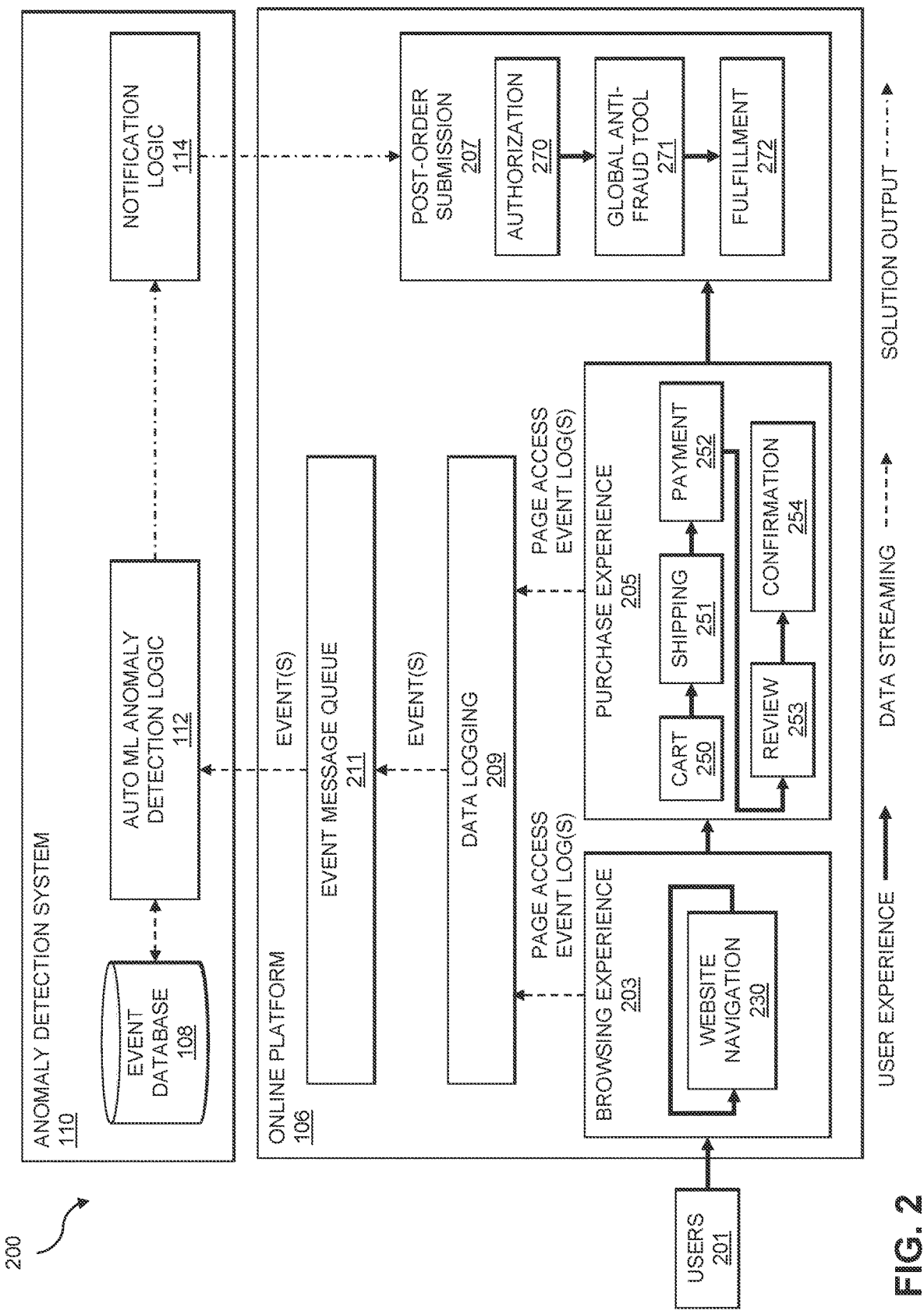
FIG. 2 shows an anomaly detection system interacting with an online platform in an illustrative embodiment.

FIG. 2 shows a system overview 200, which includes the anomaly detection system 110 configured to operate in parallel with the online platform 106. The online platform 106 includes various elements that track the events of users 201 (e.g., of client devices 102, not shown) as they browse a website or other interface to navigate through the online platform 106. The users 201 shown in FIG. 2 can include non-fraudulent or "normal" users and various categories of fraudulent or "malicious" actors (e.g., fraudulent actors and/or resellers). The users 201 utilize a browsing experience 203 of the online platform 106, which includes website or other interface navigation 230 (e.g., which the users 201 use to browse different products made available on the online platform 106 as part of a browsing experience 203).

The website or other interface navigation 230 will eventually bring the users 201 to a purchase experience 205 of the online platform 106, which may include different pages or interfaces for completing purchase orders, including a cart page 250 (e.g., showing products that the users 201 have selected for purchase), a shipping page 251 (e.g., for entering shipping details where the selected products are to be sent), a payment page 252 (e.g., for entering payment information, such as credit card information and billing address information), a review page 253 (e.g., for enabling the users 201 to confirm the selected products as well as the entered shipping and payment information), and a confirmation page 254 (e.g., for informing the users 201 whether a purchase order has been successfully placed). The online platform 106 also includes post-order submission 207 functionality, such as credit card or other payment information authorization 270, application of a global anti-fraud tool (GAFT) 271, and purchase order fulfillment 272.

As the users 201 navigate through the browsing experience 203 and purchase experience 205 of the online platform 106, page access event logs are provided to a data logging tool 209. The data logging tool 209 can analyze the page access event logs in order to detect "events" that are passed to an event message queue 211. The event message queue 211 passes the detected events to the anomaly detection system 110, which applies the auto ML anomaly detection logic 112 using the received events (e.g., which may be stored in the event database 108) to detect and classify the users 201 (e.g., as normal or non-malicious users, fraud actors, or resellers). In some embodiments, such classifications are used by the notification logic 114 of the anomaly detection system 110. The notification logic 114 can provide notifications to the post-order submission 207 functionality of the online platform 106 when particular purchase orders are determined (e.g., with some threshold confidence level) to be associated with users 201 who are classified as being anomalous users (e.g., fraud actors or resellers). Such notifications may trigger one or more remedial actions (e.g., requiring additional or more intensive credit card or other payment information authorization 270 processes, running the GAFT 271, preventing purchase order fulfillment 272, etc.).

The auto ML anomaly detection logic 112 of the anomaly detection system 110 analyzes the events provided by the event message queue 211 (e.g., in substantially real-time) by processing such event information with one or more machine learning models that generate the classifications of the users 201. In some embodiments, such classifications are generated before the users 201 complete the purchase process in the purchase experience 205. The classifications of the users 201 may also be generated and dynamically updated as the users 201 navigate through the browsing experience 203 and the purchase experience 205.

During the purchase process on the online platform 106, several different users 201 may be browsing the website or other interface of the online platform 106. The users 201, as noted above, may include malicious actors, such as fraud actors and resellers. The technical solutions described herein provide a scalable architecture for detecting and preventing such behavior on the online platform 106, without substantially interfering with the user experience of non-malicious users, for example.

The architecture in some embodiments includes a computational model in which different microservices or modules communicate with each other to provide anomaly detection in real-time or near real-time. The architecture in some embodiments also includes databases, a cache engine, a filtering mechanism, and the definition of internal and external application programming interfaces (APIs). The architecture is advantageously scalable and non-intrusive, requiring minimal or no modification to existing online platforms to enable them to utilize the solutions described herein.

The anomaly detection system 110 in some embodiments is configured to detect anomalous activity as the users 201 navigate the website or other interface of the online platform 106 (e.g., website or other interface navigation 230 during the browsing experience 203, the various pages 250 through 254 of the purchase experience 205, etc.). Insights from data analysis, data prediction and scalability approaches are used to design the anomaly detection system 110 which is configured to operate in real-time or near real-time to detect various types of fraudulent activity.

The anomaly detection system 110, via the auto ML anomaly detection logic 112, employs machine learning computational modules to classify the users 201 (e.g., their associated probabilities of being normal or non-malicious users, fraudulent actors, and resellers). The technical solutions described herein provide various advantages, including: through the use of a scalable system architecture that supports replication of the different machine learning and other computational modules to balance load; through the use of a system that is agnostic to technologies, such that the computational modules can work apart from the technologies (e.g., the specific physical and/or virtual computing resources) used to implement the anomaly detection system 110; through enabling real-time processing which aims at processing streaming data to generate output (e.g., classifications of the users 201) as quickly as possible; through enabling the anomaly detection system 110 to run apart from the online platform 106 such that no or minimal modifications to the website or interface of the online platform 106 are needed; and the ability to process data asynchronously to generate notifications using the notification logic 114 in a publish/subscribe fashion which is able to run in parallel with the online platform 106 to generate notifications in a messaging queue that the online platform 106 can consume to take action against potentially fraudulent activity.

In some embodiments, the anomaly detection system 110 utilizes a set of microservices for performing different tasks such as data acquisition, data processing, and data prediction. Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices.

In a microservice architecture, a single application (e.g., such as the anomaly detection system 110) is developed as a suite of small microservices. A microservice can run on its own process and communicate with other systems or services through a lightweight mechanism, such as a hypertext transport protocol (HTTP) resource API or communication API provided by an external system. Microservices in some embodiments are assumed to be independently deployable using fully automated deployment mechanisms.

In some embodiments, microservices are small, independent, and composable services that can be accessed through Representational State Transfer (RESTful) APIs. Thus, a single monolithic application such as the anomaly detection system 110 may be broken down into separate and independent microservices for discrete functions, providing potential benefits in innovation, manageability, resiliency, and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

The anomaly detection system 110 can integrate with an existing online platform 106 (e.g., providing the browsing experience 203, purchase experience 205 and post-order submission 207 functionality) through an event middleware (e.g., data logging tool 209 and event message queue 211). When users 201 browse the online platform 106 and navigate through the purchase process, their web browsers can send two types of HTTP requests to web servers of the online platform 106: HTTP GET requests, where the web browsers of the users 201 request data from the web servers of the online platform 106; and HTTP POST requests, when the web browsers of the users 201 send data to the web servers of the online platform 106. The online platform 106 logs such HTTP GET and HTTP POST requests jointly with information regarding the users 201 and the page(s) requested, which are provided as the page access event logs from the browsing experience 203 and purchase experience 205 to the data logging tool 209.

The event middleware includes the data logging tool 209 and event message queue 211, which processes the page access event logs and transforms them into events that can be consumed by other applications. Although in FIG. 2 the event middleware is shown as being part of the online platform 106, this is not a requirement. The event middleware may be implemented at least in part internal to the anomaly detection system 110, or at least in part external to both the online platform 106 and the anomaly detection system 110. In some embodiments, the event message queue 211 provides a publish/subscribe system that forwards each event (e.g., as soon as they are generated) to the anomaly detection system 110. The publish/subscribe system provided via the event message queue 211 can advantageously consume the events in real-time or near real-time. The anomaly detection system 110 is configured, via the auto ML anomaly detection logic 112, to process each event and transform it into several features to be used in the machine learning models. A management computation module (e.g., a fraud manager) orchestrates the machine learning models by calling associated machine learning computation modules to perform predictions or classifications of the users 201 as they browse the online platform 106 and navigate through the browsing experience 203 and the purchase experience 205. Once the machine learning computational modules produce their classification results, the fraud manager sends a notification to an additional publish/subscribe system implemented using the notification logic 114, which can be used by other applications in the post-order submission 207 of the online platform 106 (e.g., credit card or other payment information authorization 270, GAFT 271, purchase order fulfillment 272) to take actions according to the generated notifications.

Figure 3A:
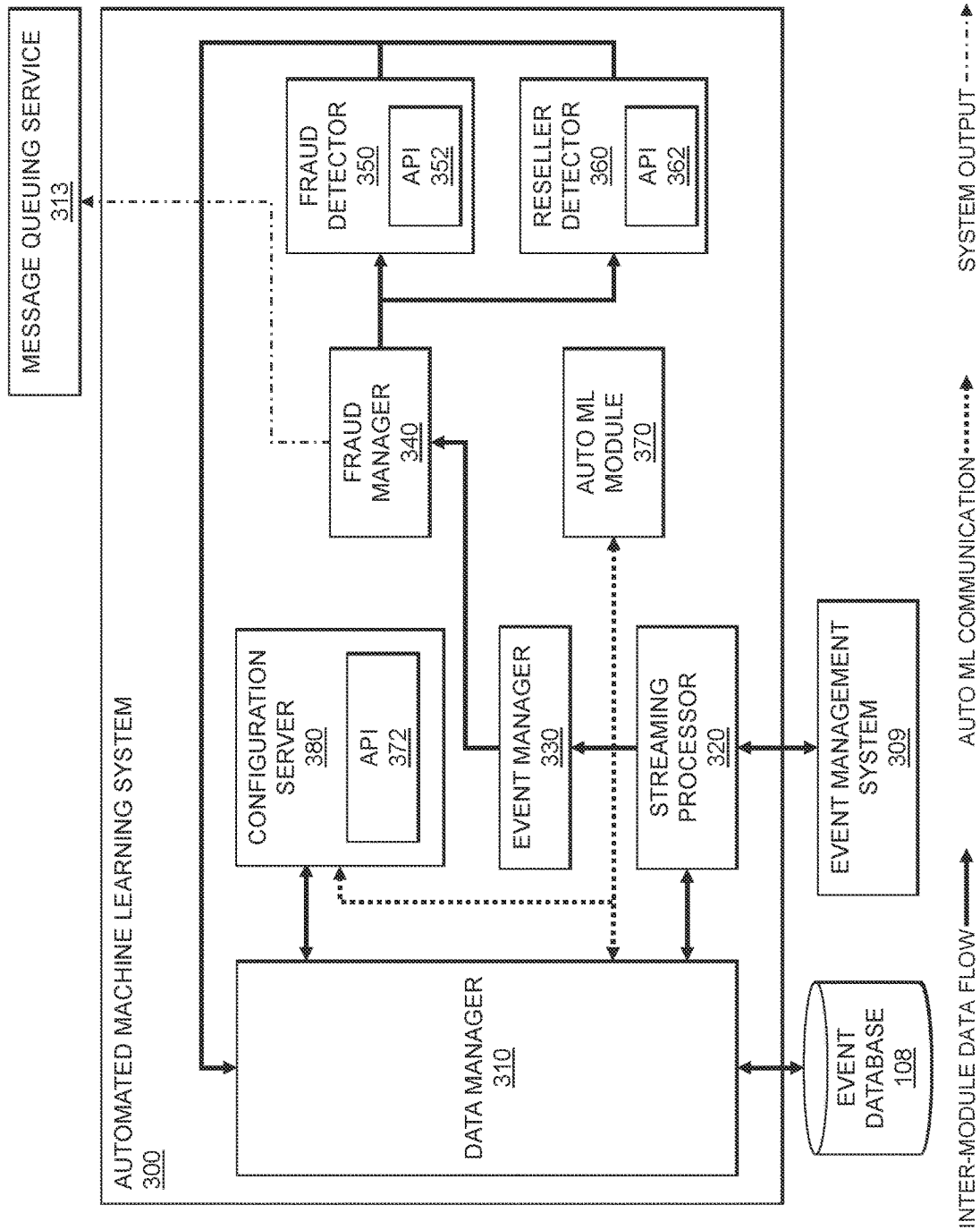
FIGS. 3A and 3B show an example architecture for an anomaly detection system in an illustrative embodiment.
Figure 3B:
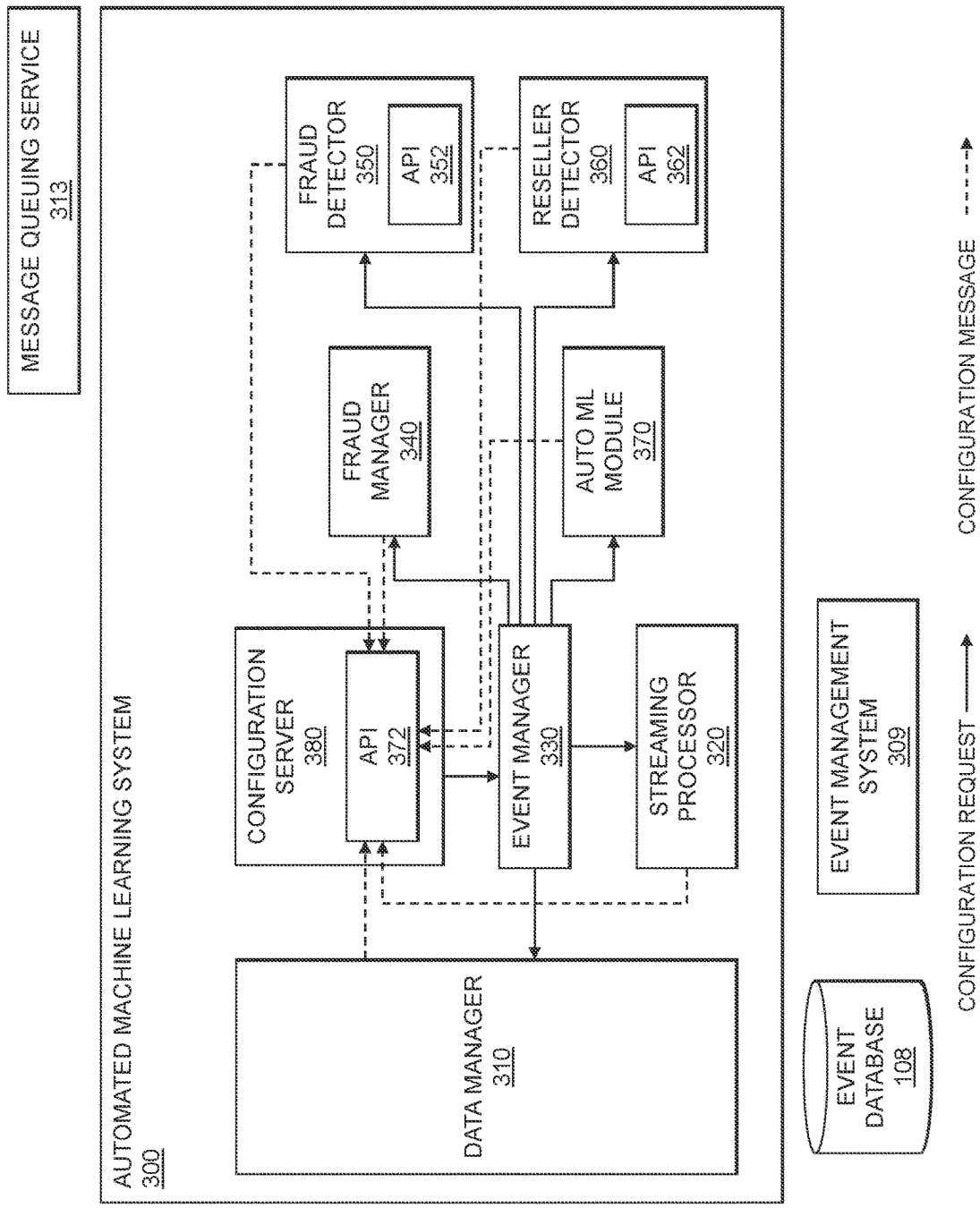

An example implementation of the above-described architecture of the anomaly detection system 110 will now be described. FIGS. 3A-3B (collectively referred to as FIG. 3) show an automated machine learning system 300, which includes a data manager 310, a streaming processor 320, an event manager 330, a fraud manager 340, a fraud detector 350, a reseller detector 360, an auto ML module 370, and a configuration server 380. In some examples, it is assumed that each of these components are implemented as microservices running in respective software containers that provide various portions of the functionality of the auto ML anomaly detection logic 112. In the FIG. 3 example, the fraud detector 350, the reseller detector 360, and the configuration server 380 include respective APIs 352, 362, and 372.

It is noted that FIG. 3A shows inter-module data flows, auto ML communications, and system output between various components of the automated machine learning system 300, and FIG. 3B shows configuration requests and configuration messages between various components of the automated machine learning system 300.

The data manager 310 interacts with the event database 108, and the streaming processor 320 interacts with an event management system 309 (e.g., which may be part of event middleware of the online platform 106, such as the event message queue 211). Although not explicitly shown, each of the components 310, 320, 330, 340, 350, 360, 370, and/or 380 may also interact with a data logging system (e.g., such as the data logging tool 209 in FIG. 2) responsible for collecting the status related to each of the components, as well as storing any error messages. The data logging system can assist with controlling storage overloads and/or error messages, for example, and thus each component may be configured to report its status to the data logging system.

The fraud manager 340 interacts with a message queuing service 313 providing at least a portion of the functionality of the notification logic 114. The data manager 310 manages database operations with the event database 108, and provides data storage and access functionality for other components in the automated machine learning system 300.

In some embodiments, the streaming processor 320 acquires data from external sources providing the system input (e.g., the event management system 309). For example, the streaming processor 320 may consult with a message queue to receive different types of data. As non-limiting examples, the different data types can include navigation (NAV) data, Credit Card Salted Hash (CSH) data, and Purchase (PUR) data, as described in more detail below.

The event manager 330 can process or detect events in the acquired data and provide detected events and/or features extracted therefrom to other components of the automated machine learning system 300.

In the example shown in FIG. 3, the fraud manager 340 can orchestrate the execution of the fraud detector 350 and the reseller detector 360, and can generate notifications regarding anomalous activity (e.g., credit card or other payment fraud and/or malicious reseller activity) which are provided to the message queuing service 313.

Also, the event management system 309, the message queuing service 313 and the event database 108 are shown in FIG. 3 as being implemented external to the automated machine learning system 300, however, it is to be appreciated that in other embodiments one or more of the event management system 309, the message queuing service 313, and the event database 108 may be implemented at least in part internally to the automated machine learning system 300.

The fraud detector 350 executes a machine learning model that predicts the probability of a given customer being a fraud actor (e.g., a user that is conducting credit card or other payment fraud), and the reseller detector 360 executes a machine learning model to predict the probability of a given customer being a reseller.

The automated machine learning system 300 consumes events from the online platform 106 (e.g., from an event management system 309 associated with the online platform 106). In some embodiments, the events are consumed in a publish/subscribe fashion. The online platform 106 is assumed to track customer behavior and generate events in a message queue which are received at the automated machine learning system 300 via the event management system 309. For example, the events can be classified into different types according to their source, such as: CSH events, NAV events, and PUR events. CSH events are generated when a user submits credit card information as a payment method for a purchase order on the online platform 106. NAV events are generated every time a user requests a web page from the online platform 106. PUR events are generated when a user places a purchase order on the online platform 106.

The process of purchasing a product on the online platform 106 may include several steps that the user performs. Referring back to FIG. 2, such steps may include website or other interface navigation 230 during the browsing experience 203 as well as accessing different ones of the pages 250 through 254 during the purchase experience 205. At each new page request, the online platform 106 generates a NAV event which includes various fields as shown in table 600 of FIG. 6, for example.

To start the process of purchasing a product, after the product is added to the "cart" the user can provide a payment method. For example, when opting for credit card payment, the user accesses a specific page to provide the credit card information and then submits it for validation. Each time data is submitted on this page, the online platform 106 generates a CSH event which contains various fields as shown in the table 700 of FIG. 7. When the user finishes the purchasing process by submitting the order, the online platform 106 generates a PUR event which includes the various fields as shown in the table 800 of FIG. 8, for example.

According to some embodiments, the streaming processor 320 of FIG. 3 listens for incoming events (e.g., CSH, NAV and PUR events that are generated by the online platform 106) and processes the incoming events for data storage. In some embodiments, such data storage may include updating features in an in-memory database and/or storing events in a relational database (e.g., event database 108). If successful, messages can be published to notify the event manager 330 that events have been detected. The event manager 330 can process the messages and notify any subscribers thereof.

It is noted that the anomaly detection system 110 of FIG. 1, which may be implemented at least in part using the automated machine learning system 300 of FIG. 3, can use data from external sources, which the streaming processor 320 acquires when events are available. Accordingly, the streaming processor 320, in some embodiments, can parse the events and store event data locally for faster retrieval by other microservices in the automated machine learning system 300 (e.g., for use in the machine learning models implemented by the fraud detector 350 and/or the reseller detector 360). In such embodiments, a local data storage strategy can be used, where data is stored in accordance with two different database models: a relational database and an in-memory database.

The relational database stores all events that are acquired from the external sources. The relational database may employ Structured Query Language (SQL) for managing data. In some embodiments, a time-series SQL database can be used to improve performance and scalability for time-series data. Each event that is processed follows a time sequence as the events are collected by the online platform 106. Time can be an important factor when analyzing data by the fraud detector 350 and the reseller detector 360. Therefore, using a time-series SQL database can help improve the performance for analyzing time-series data.

The fraud manager 340 receives messages from the event manager 330 and determines the types of the detected events. The fraud manager 340 can then trigger the fraud detector 350 and/or the reseller detector 360 depending on the type of detected event. For example, when CSH events are generated, it means that the customer has already started the purchase process of one or more products and has provided credit card or other payment information. Thus, if the arriving event is determined to be a CSH event, the fraud manager 340 may invoke the fraud detector 350 and/or the reseller detector 360.

In some embodiments, the fraud manager 340 can also determine whether at least one of the results (e.g., from the fraud detector 350 and the reseller detector 360) exceeds associated thresholds. If so, then the fraud manager 340 can generate and publish a notification to an external message queue (e.g., the message queuing service 313).

Figure 4:
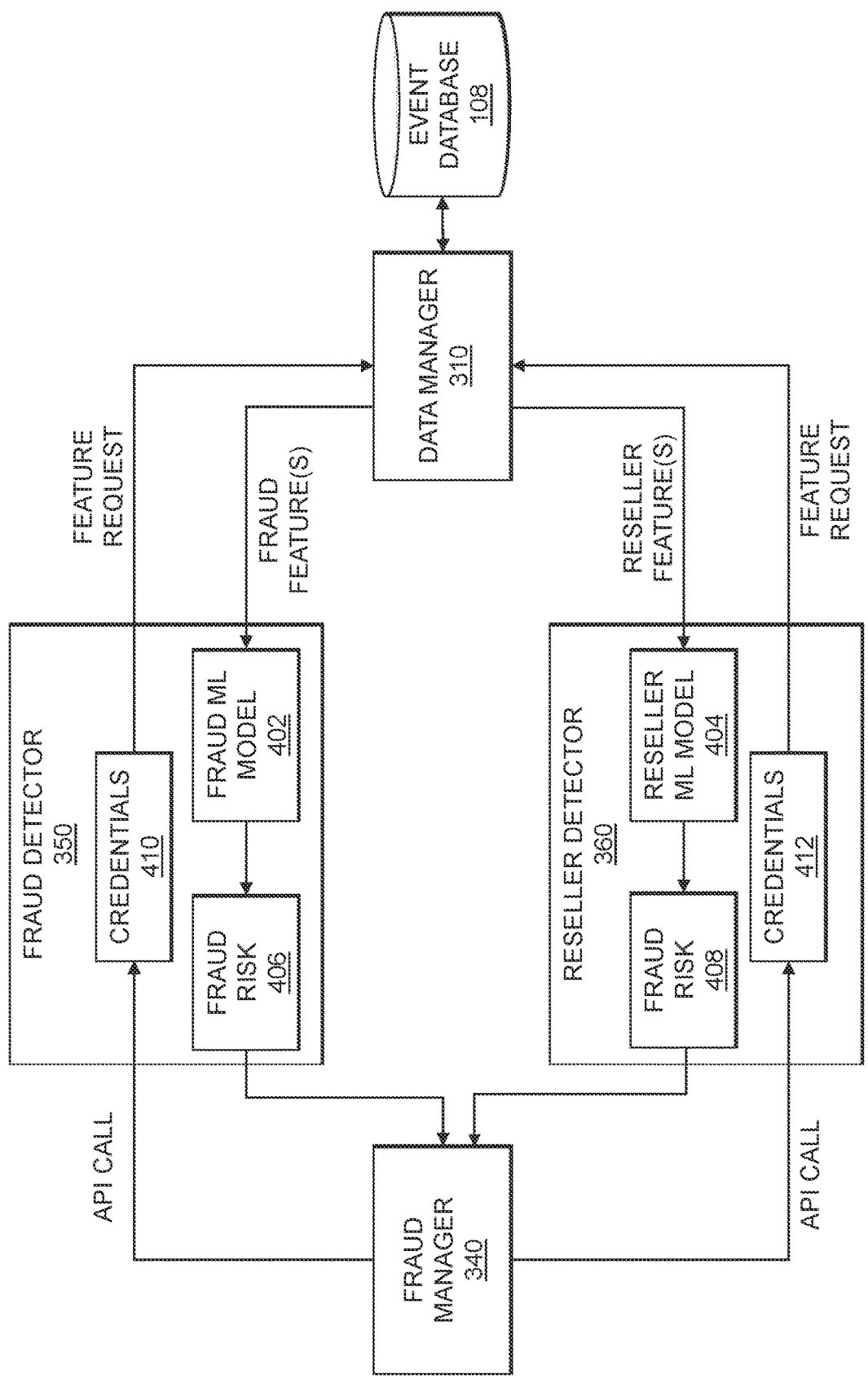
FIG. 4 is diagram illustrating in more detail components that may be used in connection with an embodiment of the anomaly detection techniques disclosed herein.

FIG. 4. is a diagram showing a more detailed example of detection components that may be used in connection with an embodiment of the anomaly detection techniques disclosed herein. In this particular example, the fraud detector 350 and the reseller detector 360, respectively, comprise a fraud ML model 402 and a reseller ML model 404. In some embodiments, it is assumed that the ML models 402 and 404 are initially trained (e.g., using an offline supervised or semi-supervised training process) to predict respective fraud risks 406 and 408. For example, the ML models 402 and 404 can be trained using historical data, where such data explains the behavior of users (e.g., users 201) over a particular time window.

In the FIG. 4 example, the fraud detector 350 and the reseller detector 360 can generate the fraud risks 406 and 408 in response to receiving API calls from the fraud manager 340. For example, in response to receiving an API call from the fraud manager 340, the fraud detector 350 may obtain credentials 410 associated with one or more users (e.g., a given one of the users 201). The fraud detector 350 can use the credentials 410 to generate a feature request to the data manager 310 to retrieve one or more fraud features associated with such users from the event database 108 via the data manager 310. The fraud detector 350 provides the fraud features to the fraud ML model 402 to generate the fraud risk 406, which is then provided to the fraud manager 340. The reseller detector 360 operates in a similar manner (e.g., by requesting one or more reseller features from the data manager 310 using credentials 412). In some embodiments, the fraud risk 406 can correspond to a probability that a user should be classified as a fraudulent user, and the fraud risk 408 can correspond to a probability that the user is an unauthorized reseller, for example.

Referring again to FIG. 3, the auto ML module 370 is configured to improve the predictions generated by the fraud detector 350 and reseller detector 360. For example, the auto ML module 370 can generate multiple configurations of the ML models used by the detectors 350 and 360, and then compare the configurations against the current configurations, as explained in more detail in conjunction with FIG. 5, for example.

The configuration server 380 manages configuration updates across the automated machine learning system 300 based at least in part on the configuration messages and requests shown in FIG. 3B. In some embodiments, the configuration server 380 can store configurations for one or more of components 310, 320, 330, 340, 350, 360, and 370 in the event database 108 (e.g., using data manager 310). When the configuration server 380 receives an updated configuration, the configuration server 380 saves the updated configuration in the event database 108. The updated configuration is published to a specific configuration topic in the event manager 330. Accordingly, each of the components 310, 320, 330, 340, 350, 360, and 370 can listen to its respective topic to receive the updated configuration. It is noted that when an instance of a given one of the components 310, 320, 330, 340, 360, and 370 is started, it can request the last active configuration from the configuration server 380. In some examples, the configuration server 380 can also provide an interface for an administrator to manually update or modify one or more configurations.

It is noted that the configuration server 380, in some embodiments, can manage the configurations for at least some of the components 310, 320, 330, 340, 350, 360, and 370 in a centralized manner to prevent desynchronization. For example, in some embodiments, a given one of the components 310, 320, 330, 340, 350, 360, and 370 can request its current configuration from the configuration server 380 or request that its configuration be changed (e.g., added, modified, and/or replaced) by the configuration server 380. In response to such a request, the configuration server 380 can update the configuration for the given component in the event database 108 by making any changes that may be needed. The configuration server 380 can then send the updated configuration of the given component to the event manager 330. The given component, in some embodiments, is then responsible for retrieving the configuration from the event manager 330 and updating itself.

Figure 5:
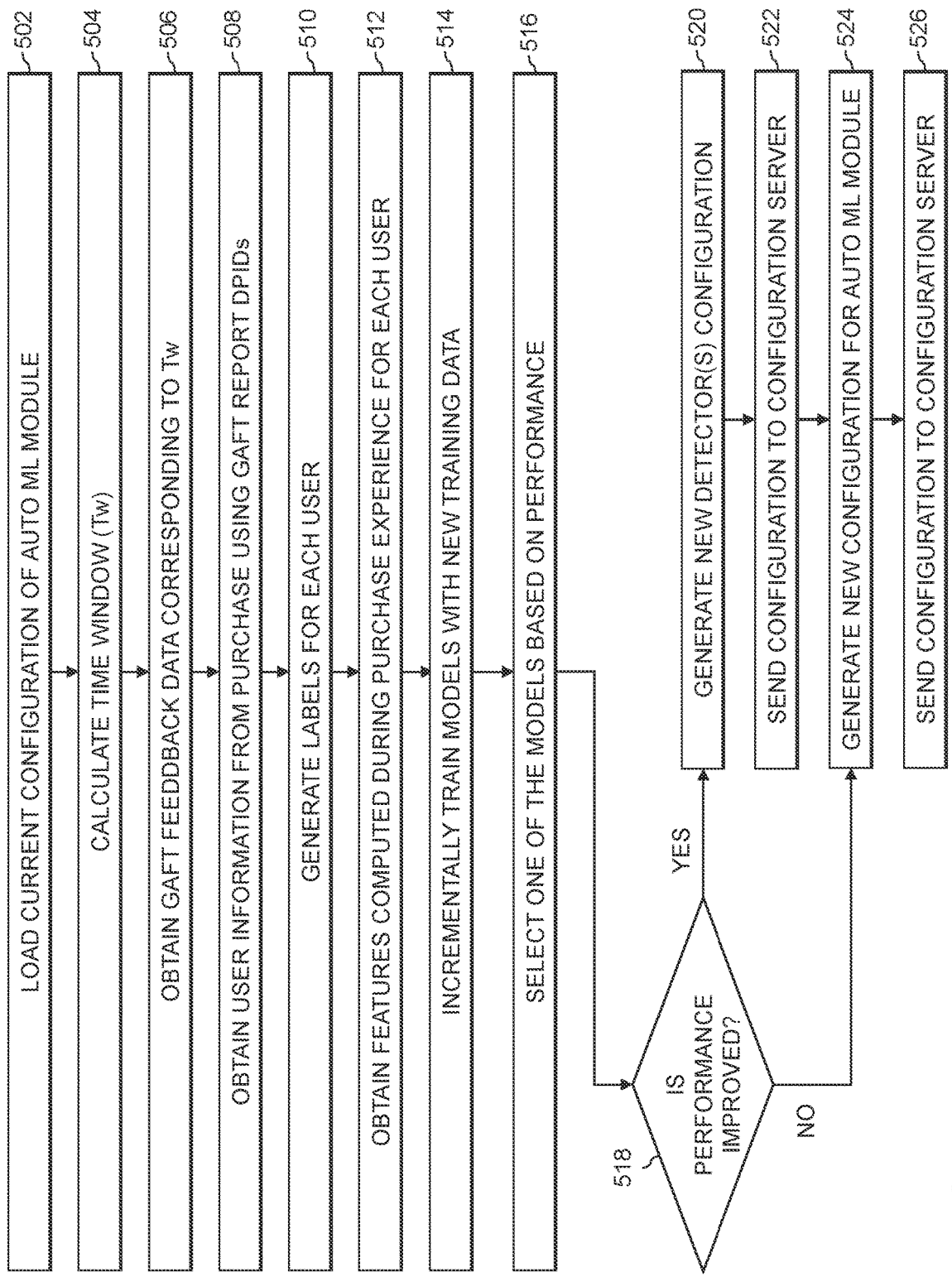
FIG. 5 shows an execution flow of an automated machine learning process in an illustrative embodiment.

FIG. 5 shows a flow diagram of an incremental learning process in an illustrative embodiment. The incremental learning process, in some embodiments, can be performed by the auto ML module 370 to update a configuration of at least one of the detectors 350 and 360, via the configuration server 380.

Step 502 includes loading a current configuration of the auto ML module 370, for example. In some embodiments, the current configuration can be retrieved from the event database 108 (e.g., via the configuration server 380 and/or the data manager 310) based on information corresponding to one or more ML models that are currently being used (e.g., in a production environment) by detectors 350 and/or 360. For example, the information can include at least one compressed file associated with the one more or more ML models and a time window corresponding to data used when training the one or more ML models. In one embodiment, the information associated with the time window can include a first parameter indicating a period of time (e.g., in days), going back from the current time, that was not considered when training the one or more ML models, and a second parameter indicating an amount of time (e.g., in days) that was considered to train the one or more ML models. For example, if the first parameter is set to one day and the second parameter is set to seven days, then the time window would begin eight days prior to the current day and last seven days. It is to be appreciated that other techniques can be used to indicate and/or calculate the time window in other embodiments. Step 504 includes calculating a time window (Tw). For example, Tw can define an initial timestamp and a final timestamp for a period of time to be considered. For example, Tw can be based at least in part on the time window information discussed in conjunction with step 502. In other embodiments, Tw can be specified, e.g., by a user.

Step 506 includes obtaining GAFT feedback data corresponding to Tw. The GAFT feedback data may include, for example, one or more GAFT events associated with Tw. In at least some embodiments, the GAFT events can include the various fields shown in the table 900 of FIG. 9, and the GAFT events can be broken down into features utilized by the one or more ML models corresponding to the detectors 350 and 360. As an example, some features (e.g., the number of repeated orders placed by the user for the same product) may be considered more relevant for training and/or testing a ML model for detecting unauthorized reseller fraudulent behavior, whereas other features (e.g., number of times that a user tested a credit card) may be considered more relevant for training and/or testing an ML model to detect fraudulent behavior, as discussed further below in conjunction with FIG. 10, for example.

Step 508 includes obtaining user information from purchases based on unique identifiers of orders included in the obtained GAFT events. The order unique identifiers can correspond to the DPID field in table 900, which can be used, for example, to obtain user information from PUR events corresponding to the DPIDs. The user information can include the information corresponding to the MCMID, IPADDRESS, CSH, and/or other fields in the table 800, and possibly user profile information.

Step 510 includes generating labels for each user (e.g., labeling each user as one of a fraud, reseller, or typical user).

Step 512 includes obtaining features that were computed during the purchase experience for each of the users, thereby generating a set of new training data.

Step 514 includes incrementally training one or more ML models associated with the detectors 350 and/or 360 with the new training data. For example, the configuration loaded in step 502, in some embodiments, can include a compressed file comprising at least one ML model that is currently being used by at least one of the detectors 350 and/or 360 in a production environment. The auto ML module 370 can decompress the file to obtain the at least one ML model. Step 514 can then perform an incremental learning process using the at least one ML model. The incremental learning process can include, for example, incrementing the following versions of the at least one ML model: a basis model (BM), a basis incremental model (BIM), and an extended incremental model (EIM), as explained in more detail in conjunction with FIG. 11, for example.

Step 516 includes selecting one of the ML models (e.g., one of the BM, BIM, and EIM) based on their respective performance. The performance of the models can be based on one or more performance characteristics (e.g., accuracy, speed, etc.). In some embodiments, if two or more of the ML models have substantially the same performance (e.g., within some specified threshold level), then the selection can be based on the size of the ML models (e.g., if two of the ML models perform substantially the same, then the ML model having the smaller size is selected).

Step 518 checks whether the ML model selected in step 516 has improved performance relative to the ML model currently being used by the automated machine learning system 300, for example. If so, then the process continues to step 520, which includes generating one or more new detector configurations (with respect to detector 350 and/or detector 360, for example). Step 522 includes sending the new configuration generated in step 522 to the configuration server (e.g., configuration server 380). If the result of step 518 is no, then the process continues directly to step 524.

Step 524 includes generating a new configuration for the auto ML module 370, and step 526 includes sending the new configuration to the configuration server.

In some embodiments, one or more of the detectors 350 and 360 can be implemented using a Multi-Layer Perceptron (MLP) machine learning model, which is a type of feedforward Artificial Neural Network (ANN). Using the reseller detector 360 as an example, an MLP machine learning model may be trained with previous purchases recognized as reseller activity by the GAFT 271. Different features are extracted from such previous purchases, followed by parameter tuning to create an execution flow for the MLP machine learning model of the reseller detector 360.

The first part of the ML process, in some embodiments, can include creating features from the dataset (e.g., the previous purchases recognized as reseller activity). For example, the features can be built based on insights manually extracted from the dataset. The common patterns can be visualized when analyzing the past NAV, PUR and CSH events associated with previous purchases flagged as reseller activity by the GAFT 271. The features collected from the customer navigation leading up to the past purchases can be used to train the machine learning model using the labeled data.

FIG. 10 shows a table 1000 of features that are used in some embodiments to train and predict whether particular customer behavior represents reseller activity. To validate the selected feature set in table 1000, a GAFT analysis on reseller activity of previous purchases on the online platform 106 is performed. In some embodiments, validation is performed using data for some specified period of time (e.g., a particular number of days). The NAV, PUR and CSH information is also obtained for the same period of time. The dataset can be divided into training and test portions (e.g., with a 70/30 training/testing split). This training dataset can then be used to incrementally train (e.g., at step 516) the ML models, and the testing dataset can be used to evaluate the ML models (e.g., at steps 518-520).

As noted above, the auto ML module 370 can use multiple different architectures (e.g., a basis model, a basis incremental model and an extended incremental model) capable of making predictions parallel. The three different architectures can compete with each other to increase the system performance.

Figure 11:
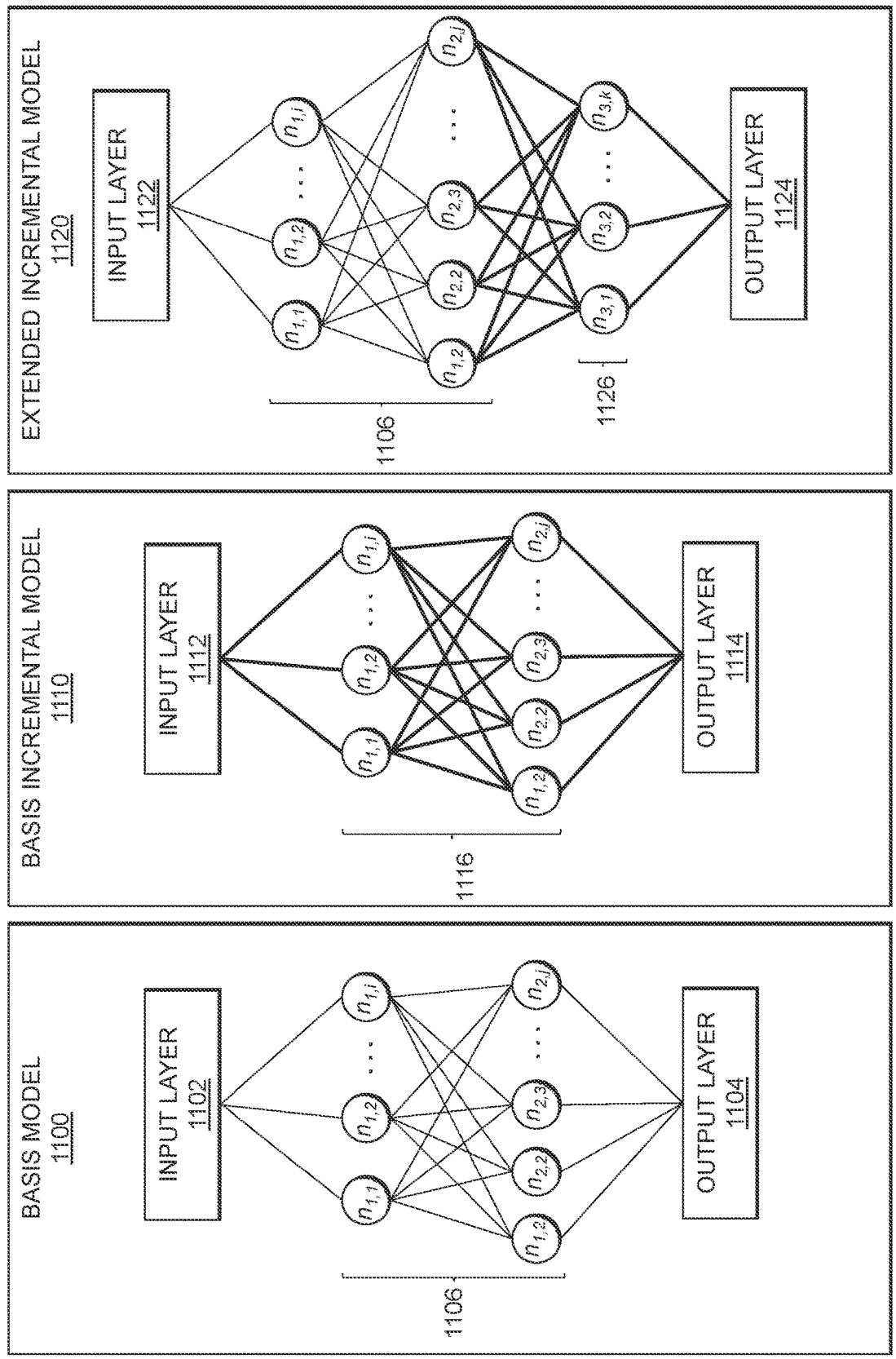
FIG. 11 shows examples of machine learning models used in an anomaly detection system in an illustrative embodiment.

FIG. 11 shows examples of a BM 1100, a BIM 1110, and an EIM 1120 in an illustrative embodiment.

The BM 1100 includes an input layer 1102, an output layer 1104, and two hidden layers 1106. The BM 1100 is assumed to be trained using historical data and is incapable of learning after it is trained. In this regard, the BM 1100 can be considered a "frozen" model. More specifically, once the weights of the ANN inherent to the BM 1100 are obtained, they do not change. The BM 1100 generally enables fast predictions, but the predictions are all based on a static set of historical data of users. Hence, if users change the manner in which they operate (e.g., with respect to online platform 106), then the predictions generated by the BM 1100 may not be accurate.

The BIM 1110 also includes an input layer 1112, an output layer 1114, and two hidden layers 1116. However, the BIM 1110 is configured to be a trainable version of the BM 1100, as indicated by the bold connections in FIG. 11. It is noted that before the BIM 1110 is trained on new data, the BM 1100 and the BIM 1110 are the same models. As the behavior of users changes over time, the BIM 1110 can be updated and continuously adapt itself, which often results in the BIM 1110 maintaining an acceptable level of performance.

The EIM 1120 includes an input layer 1122, an output layer 1124, and three hidden layers 1106, 1126. The EIM 1120, in this example, maintains the "frozen" architecture of the BM 1100 (e.g., it includes the same hidden layers 1106) but also adds an additional layer 1126. More generally, the BM 1100 may be assumed to be the "base" of the EIM 1120, and a set of one or more new trainable layers may be stacked successively from the layers of the BM 1100. It is noted that the hidden layers 1106 of the EIM 1120 were previously trained, and the extended incremental learning may be described as a coupling of the BM 1100 and a collection of new trainable layers, which in this example corresponds to layer 1126.

Generally, it is expected that the BM 1100 is expected to achieve better performance on unseen data (e.g., shortly after it is deployed). On the other hand, as new fresh data is gathered, both the BIM 1110 and the EIM 1120 can keep learning, thus allowing them to adapt themselves to learn new patterns regarding the unknown behavior of malicious users. An evaluation metric can be used to select which of the models should be used at a particular time (the selected model is referred to herein as the preferred model). For example, if the three models achieve the same performance, then the simplest model (e.g., the model with smallest size) can be selected as the preferred model. In some embodiments, considering the complexity intrinsic to each model and assuming a scenario where all models achieve roughly the same performance, the preferred model can be selected based on the following order: BM 1100 (least complex), BIM 1110, and EIM 1120 (most complex). Assuming this selection order can help avoid overfitting. Although there is no guarantee regarding which model will be the higher performing model, it is natural that the BM 1100 reveals a superior performance initially, but when the dynamic behavior of users changes with time, it is expected that the incremental models will perform better than the BM 1100.

Figure 12:
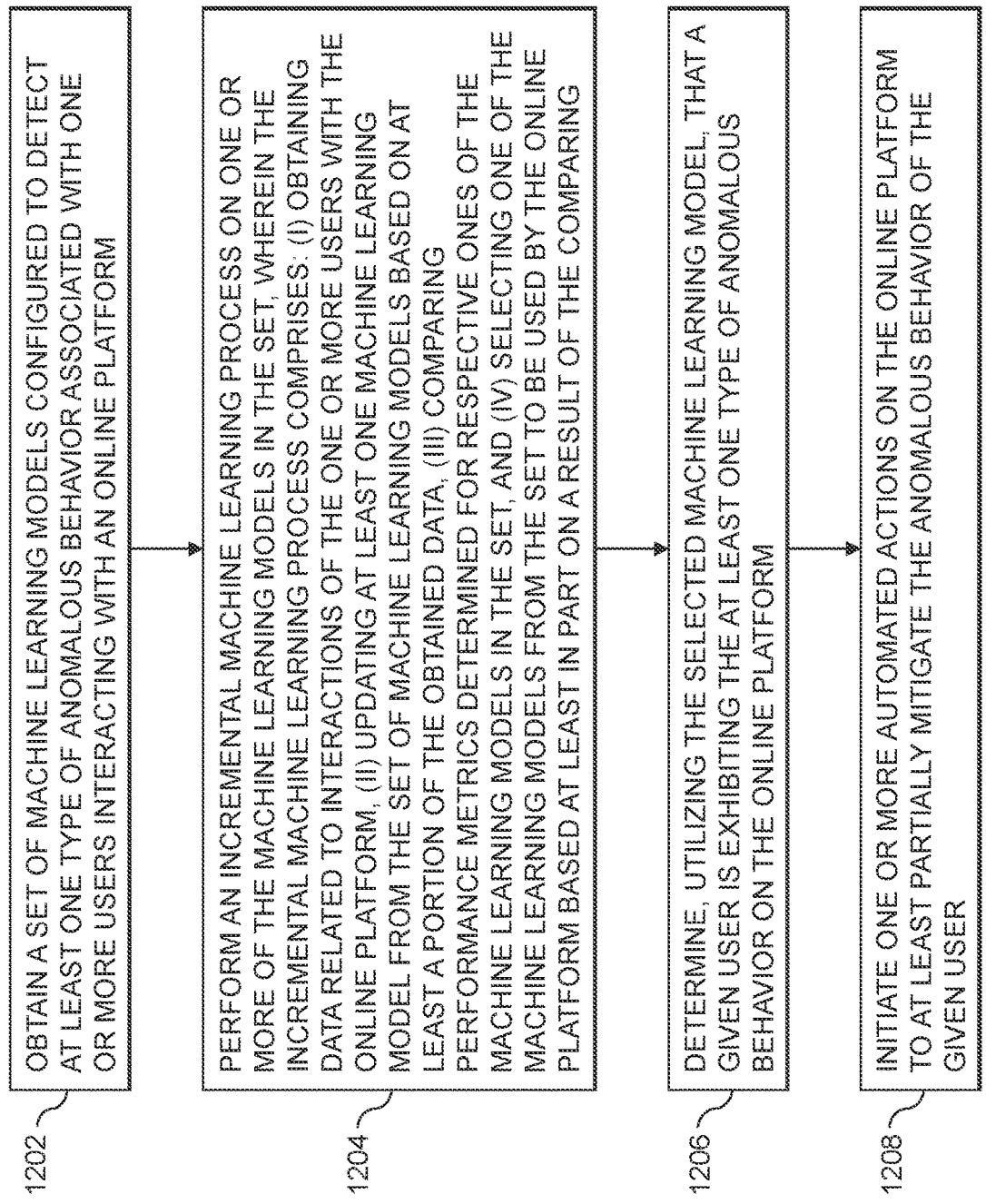
FIG. 12 shows a flow diagram of a process for detection of anomalous behavior on online platforms using machine learning techniques in an illustrative embodiment.

FIG. 12 is a flow diagram of a process for detection of anomalous behavior on online platforms using machine learning techniques in an illustrative embodiment. It is to be understood that this particular process is only an example, and additional or alternative processes can be carried out in other embodiments.

In this embodiment, the process includes steps 1202 through 1208. These steps are assumed to be performed by the anomaly detection system 110 utilizing its elements 112 and 114.

Step 1202 includes obtaining a set of machine learning models configured to detect at least one type of anomalous behavior associated with one or more users interacting with an online platform.

Step 1204 includes performing an incremental machine learning process on one or more of the machine learning models in the set, wherein the incremental machine learning process includes: (i) obtaining data related to interactions of the one or more users with the online platform, (ii) updating at least one machine learning model from the set of machine learning models based on at least a portion of the obtained data, (iii) comparing performance metrics determined for respective ones of the machine learning models in the set, and (iv) selecting one of the machine learning models from the set to be used by the online platform based at least in part on a result of the comparing.

Step 1206 includes determining, utilizing the selected machine learning model, that a given user is exhibiting the at least one type of anomalous behavior on the online platform.

Step 1208 includes initiating one or more automated actions on the online platform to at least partially mitigate the anomalous behavior of the given user.

The set of machine learning models may include at least two of: a machine learning model that cannot be updated during the incremental machine learning process (such as a BM), a machine learning model having at least a first portion that cannot be updated during the incremental machine learning process and a second portion that is configured to be updated by the incremental machine learning process (such as an EIM), and a machine learning model that is configured to be updated by the incremental machine learning process (such as a BIM).

The at least one type of anomalous behavior associated with one or more users interacting with the online platform may correspond to at least one of fraudulent behavior and reseller behavior.

The determining that the given user is exhibiting the at least one type of anomalous behavior on the online platform may include monitoring for one or more events associated with at least the given user interacting with the online platform. The one or more events may include at least one of a navigation event associated with the given user moving between two or more pages of an interface of the online platform, a purchase event associated with the given user purchasing one or more products or services from the online platform, and a payment event associated with the given user submitting payment information to the online platform.

At least one of the machine learning models in the set may include a feedforward artificial neural network.

The process may further include a step of periodically performing the incremental machine learning process to update at least a portion of one or more of the machine learning models in the set using new data associated with users interacting with the online platform.

The one or more automated actions may include at least one action that prevents the given user from performing one or more functions associated the online platform, and/or at least one action that restricts access to one or more portions of the online platform. In some embodiments, the one or more automated actions may include at least one action for implementing one or more designated security measures. For example, if the anomalous behavior relates to one or more payments (e.g., such as credit cards), then the one or more security measures may include requiring additional or more intensive credit card or other payment information authorization processes to ensure that the user is not using stolen credit card information. The additional or more intensive authorization processes can include requesting additional information to verify the identity of the user, for example.

Accordingly, the particular processing operations and other functionality described in conjunction with the flow diagram of FIG. 12 are presented by way of illustrative example only, and should not be construed as limiting the scope of the disclosure in any way. For example, the ordering of the process steps may be varied in other embodiments, or certain steps may be performed concurrently with one another rather than serially.

Conventional approaches for fraud mitigation rely on systems that detect fraudsters' actions only after they occur. Some of the technical solutions described herein provide an architecture for real-time prediction strategies to identify anomalous behavior of users as they navigate online platforms. Through machine learning-based predictions, the technical solutions described herein can also update and evaluate machine learning models based on new data, thereby allowing the models to detect new behavioral patterns from users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms utilized to implement functionality for detecting anomalous behavior on online platforms using machine learning techniques will now be described in greater detail with reference to FIGS. 13 and 14. Although described in the context of system 100, these platforms may also be used to implement at least portions of other information processing systems in other embodiments.

Figure 13:
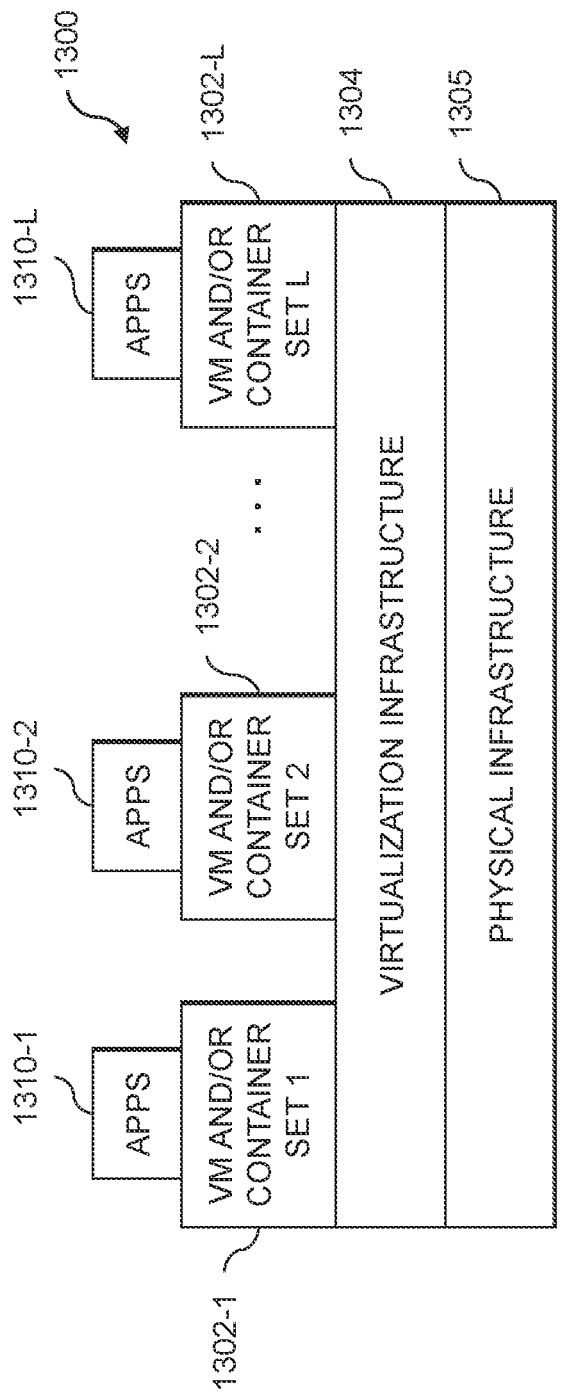
FIGS. 13 and 14 show examples of processing platforms that may be utilized to implement at least a portion of an information processing system in illustrative embodiments.
Figure 14:
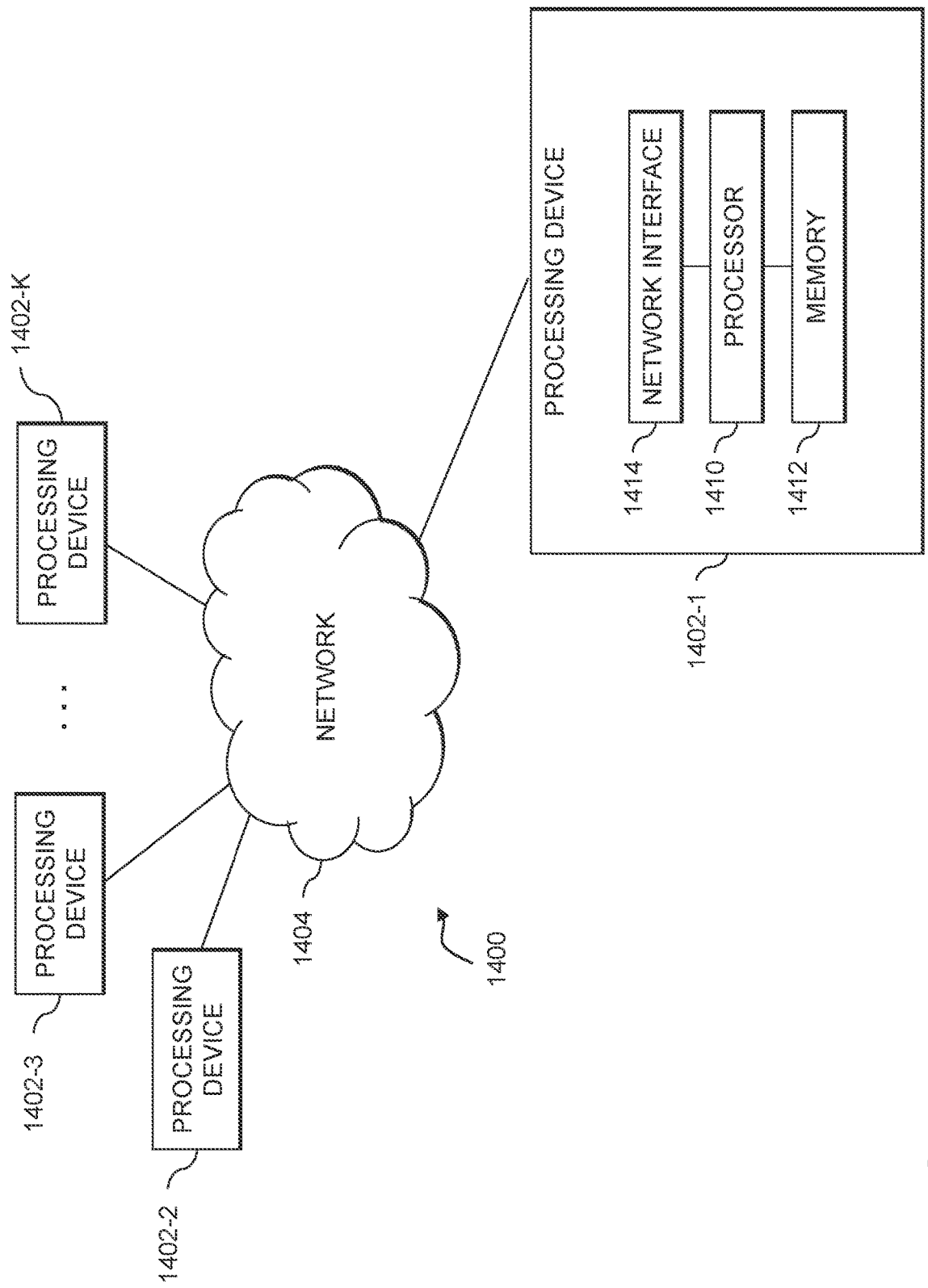

FIG. 13 shows an example processing platform comprising cloud infrastructure 1300. The cloud infrastructure 1300 comprises a combination of physical and virtual processing resources that are utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 comprise respective VMs, respective sets of one or more containers, or respective sets of one or more containers running in VMs. In some implementations of the FIG. 13 embodiment, the VMs/container sets 1302 comprise respective VMs implemented using virtualization infrastructure 1304 that comprises at least one hypervisor.

A hypervisor platform may be used to implement a hypervisor within the virtualization infrastructure 1304, wherein the hypervisor platform has an associated virtual infrastructure management system. The underlying physical machines comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 comprises random access memory (RAM), read-only memory (ROM), flash memory, or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining a set of machine learning models configured to detect at least one type of anomalous behavior associated with one or more users interacting with an online platform;
   performing an incremental machine learning process on one or more of the machine learning models in the set, wherein the incremental machine learning process comprises: (i) obtaining data related to interactions of the one or more users with the online platform, (ii) updating at least one machine learning model from the set of machine learning models based on at least a portion of the obtained data, (iii) comparing performance metrics determined for respective ones of the machine learning models in the set, and (iv) selecting one of the machine learning models from the set to be used by the online platform based at least in part on a result of the comparing;
   determining, utilizing the selected machine learning model, that a given user is exhibiting the at least one type of anomalous behavior on the online platform; and
   initiating one or more automated actions on the online platform to at least partially mitigate the anomalous behavior of the given user;
   wherein the method is performed by at least one processing device comprising a processor coupled to a memory.

2. The computer-implemented method of claim 1, wherein the set of machine learning models comprises at least two of:
   a machine learning model that cannot be updated during the incremental machine learning process;
   a machine learning model having at least a first portion that cannot be updated during the incremental machine learning process and a second portion that is configured to be updated by the incremental machine learning process; and
   a machine learning model that is configured to be updated by the incremental machine learning process.

3. The computer-implemented method of claim 1, wherein the at least one type of anomalous behavior associated with one or more users interacting with the online platform corresponds to at least one of: fraudulent behavior and reseller behavior.

4. The computer-implemented method of claim 1, wherein the determining that the given user is exhibiting the at least one type of anomalous behavior on the online platform comprises:
   monitoring for one or more events associated with at least the given user interacting with the online platform, wherein the one or more events comprise at least one of: a navigation event associated with the given user moving between two or more pages of an interface of the online platform, a purchase event associated with the given user purchasing one or more products or services from the online platform, and a payment event associated with the given user submitting payment information to the online platform.

5. The computer-implemented method of claim 1, wherein at least one of the machine learning models in the set comprises a feedforward artificial neural network.

6. The computer-implemented method of claim 1, further comprising:
   periodically performing the incremental machine learning process to update at least a portion of one or more of the machine learning models in the set using new data associated with users interacting with the online platform.

7. The computer-implemented method of claim 1, wherein the one or more automated actions comprise at least one of:
   at least one action that prevents the given user from performing one or more functions associated with the online platform; and
   at least one action that restricts access to one or more portions of the online platform.

8. The computer-implemented method of claim 1, wherein the one or more automated actions comprise at least one action for implementing one or more designated security measures.

9. A non-transitory processor-readable storage medium having stored therein program code of one or more software programs, wherein the program code when executed by at least one processing device causes the at least one processing device:

to obtain a set of machine learning models configured to detect at least one type of anomalous behavior associated with one or more users interacting with an online platform;

to perform an incremental machine learning process on one or more of the machine learning models in the set, wherein the incremental machine learning process comprises: (i) obtaining data related to interactions of the one or more users with the online platform, (ii) updating at least one machine learning model from the set of machine learning models based on at least a portion of the obtained data, (iii) comparing performance metrics determined for respective ones of the machine learning models in the set, and (iv) selecting one of the machine learning models from the set to be used by the online platform based at least in part on a result of the comparing;

to determine, utilizing the selected machine learning model, that a given user is exhibiting the at least one type of anomalous behavior on the online platform; and to initiate one or more automated actions on the online platform to at least partially mitigate the anomalous behavior of the given user.

10. The non-transitory processor-readable storage medium of claim 9, wherein the set of machine learning models comprises at least two of:

a machine learning model that cannot be updated during the incremental machine learning process;

a machine learning model having at least a first portion that cannot be updated during the incremental machine learning process and a second portion that is configured to be updated by the incremental machine learning process; and a machine learning model that is configured to be updated by the incremental machine learning process.

11. The non-transitory processor-readable storage medium of claim 9, wherein the at least one type of anomalous behavior associated with one or more users interacting with the online platform corresponds to at least one of: fraudulent behavior and reseller behavior.

12. The non-transitory processor-readable storage medium of claim 9, wherein the determining that the given user is exhibiting the at least one type of anomalous behavior on the online platform comprises:

monitoring for one or more events associated with at least the given user interacting with the online platform, wherein the one or more events comprise at least one of: a navigation event associated with the given user moving between two or more pages of an interface of the online platform, a purchase event associated with the given user purchasing one or more products or services from the online platform, and a payment event associated with the given user submitting payment information to the online platform.

13. The non-transitory processor-readable storage medium of claim 9, wherein at least one of the machine learning models in the set comprises a feedforward artificial neural network.

14. The non-transitory processor-readable storage medium of claim 9, wherein the program code further causes the at least one processing device:

to periodically perform the incremental machine learning process to update at least a portion of one or more of the machine learning models in the set using new data associated with users interacting with the online platform.

15. An apparatus comprising:

at least one processing device comprising a processor coupled to a memory;

the at least one processing device being configured:

to obtain a set of machine learning models configured to detect at least one type of anomalous behavior associated with one or more users interacting with an online platform;

to perform an incremental machine learning process on one or more of the machine learning models in the set, wherein the incremental machine learning process comprises: (i) obtaining data related to interactions of the one or more users with the online platform, (ii) updating at least one machine learning model from the set of machine learning models based on at least a portion of the obtained data, (iii) comparing performance metrics determined for respective ones of the machine learning models in the set, and (iv) selecting one of the machine learning models from the set to be used by the online platform based at least in part on a result of the comparing;

to determine, utilizing the selected machine learning model, that a given user is exhibiting the at least one type of anomalous behavior on the online platform; and to initiate one or more automated actions on the online platform to at least partially mitigate the anomalous behavior of the given user.

16. The apparatus of claim 15, wherein the set of machine learning models comprises at least two of:

a machine learning model that cannot be updated during the incremental machine learning process;

a machine learning model having at least a first portion that cannot be updated during the incremental machine learning process and a second portion that is configured to be updated by the incremental machine learning process; and a machine learning model that is configured to be updated by the incremental machine learning process.

17. The apparatus of claim 15, wherein the at least one type of anomalous behavior associated with one or more users interacting with the online platform corresponds to at least one of: fraudulent behavior and reseller behavior.

18. The apparatus of claim 15, wherein the determining that the given user is exhibiting the at least one type of anomalous behavior on the online platform comprises:

monitoring for one or more events associated with at least the given user interacting with the online platform, wherein the one or more events comprise at least one of: a navigation event associated with the given user moving between two or more pages of an interface of the online platform, a purchase event associated with the given user purchasing one or more products or services from the online platform, and a payment event associated with the given user submitting payment information to the online platform.

19. The apparatus of claim 15, wherein at least one of the machine learning models in the set comprises a feedforward artificial neural network.

20. The apparatus of claim 15, wherein the at least one processing device is further configured:

to periodically perform the incremental machine learning process to update at least a portion of one or more of the machine learning models in the set using new data associated with users interacting with the online platform.

* * * * *